US012280605B2

(12) United States Patent
Tagami et al.

(10) Patent No.: US 12,280,605 B2
(45) **Date of Patent: *Apr. 22, 2025**

(54) PRINTING DEVICE INCLUDING HOUSING, COVER ATTACHABLE THERETO, AND HOLDER MOVING IN CONJUNCTION WITH MOVEMENT OF COVER

(71) Applicant: BROTHER KOGYO KABUSHIKI KAISHA, Nagoya (JP)

(72) Inventors: Yuya Tagami, Nagoya (JP); Shinji Ukai, Kiyosu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/437,630

(22) Filed: Feb. 9, 2024

(65) Prior Publication Data

US 2024/0174013 A1 May 30, 2024

Related U.S. Application Data

(63) Continuation of application No. 17/725,856, filed on Apr. 21, 2022, now Pat. No. 11,932,028, which is a (Continued)

(30) Foreign Application Priority Data

Oct. 24, 2019 (JP) ................................. 2019-193860

(51) Int. Cl.

*B41J 2/32* (2006.01)
*B41J 15/04* (2006.01)
*B41J 29/13* (2006.01)

(52) U.S. Cl.

CPC .................. *B41J 29/13* (2013.01); *B41J 2/32* (2013.01); *B41J 15/044* (2013.01)

(58) Field of Classification Search

CPC ..... B41J 2/1752; B41J 2/32; B41J 3/36; B41J 11/14; B41J 15/044; B41J 29/02; B41J 29/13

See application file for complete search history.

(56) References Cited

U.S. PATENT DOCUMENTS 5,411,339 A 5/1995 Bahrabadi et al.
5,536,092 A 7/1996 Yamaguchi (Continued)

FOREIGN PATENT DOCUMENTS

CN 102179832 A 9/2011
CN 102189854 A 9/2011

(Continued)

OTHER PUBLICATIONS

International Search Report and Written Opinion of the International Search Report for PCT/JP2020/034881 dated Nov. 24, 2020.

(Continued)

*Primary Examiner* — Anh T Vo
(74) *Attorney, Agent, or Firm* — KENEALY VAIDYA LLP

(57) ABSTRACT

A printing device includes a housing, a print head, a platen roller, a holder, and a cover. The housing has a cassette attaching opening through which a printing cassette accommodating a printing tape is attachable to the housing. The holder holds one of the print head and the platen roller. The holder is movable between a nip position in which the print head and the platen roller nip the printing tape and a non-nip position in which the print head and the platen roller do not nip the printing tape. The cover is attachable to the housing. The cover is movable between a covering position to cover at least part of the cassette attaching opening and an engaged position to engage with the housing. The holder moves from the non-nip position to the nip position in conjunction with (Continued)

movement of the cover from the covering position to the engaged position.

6 Claims, 11 Drawing Sheets

Related U.S. Application Data continuation of application No. PCT/JP2020/034881, filed on Sep. 15, 2020.

(56) References Cited

U.S. PATENT DOCUMENTS

| | | | |
|---|---|---|---|
| 9,352,600 B2 | 5/2016 | Yamaguchi et al. | |
| 9,550,387 B2 | 1/2017 | Sakano | |
| 11,932,028 B2 * | 3/2024 | Tagami | B41J 29/13 |
| 2011/0158734 A1 | 6/2011 | Kosuge | |
| 2017/0106678 A1 | 4/2017 | Sakano et al. | |
| 2018/0250966 A1 | 9/2018 | Tsugaru | |
| 2019/0263150 A1 | 8/2019 | Iijima et al. | |

FOREIGN PATENT DOCUMENTS

| | | |
|---|---|---|
| CN | 106103117 A | 11/2016 |
| CN | 208164564 U | 11/2018 |
| JP | H07-068814 A | 3/1995 |
| JP | 2000-043350 A | 2/2000 |
| JP | 2001-018480 A | 1/2001 |
| JP | 2007-098731 A | 4/2007 |
| JP | 2008-278064 A | 11/2008 |
| JP | 2019-147335 A | 9/2019 |
| WO | 2021/079653 A1 | 4/2021 |

OTHER PUBLICATIONS

Chinese Office Action for the related Chinese Patent Application No. 202080073730.8 dated Jan. 19, 2023.

International Preliminary Report On Patentability and English language Written Opinion of the International Search Report for PCT/JP2020/034881 dated Apr. 26, 2022.

Japanese Office Action for Japanese Patent Application No. 2023-143482 dated Aug. 6, 2024.

* cited by examiner

PRINTING DEVICE INCLUDING HOUSING, COVER ATTACHABLE THERETO, AND HOLDER MOVING IN CONJUNCTION WITH MOVEMENT OF COVER

REFERENCE TO RELATED APPLICATIONS

This application is a continuation of U.S. patent application Ser. No. 17/725,856 filed Apr. 21, 2022, which is a by-pass continuation application of International Application No. PCT/JP2020/034881 filed Sep. 15, 2020 claiming priority from Japanese Patent Application No. 2019-193860 filed Oct. 24, 2019. The entire contents of the above-mentioned applications are incorporated herein by reference.

BACKGROUND ART

In a printing device that prints on printing tape, a cassette accommodating the printing tape is attached to and detached from the device body in order to supply and interchange printing tape. One conventional printing device using such a cassette has been known in which the operation of closing the cover over the cassette is associated with an operation of moving a platen roller to a position for nipping the printing tape.

SUMMARY

In this conventional printing device, the platen roller contacts the printing tape before the cover is completely closed. Therefore, if the user touches the cassette in the middle of closing the cover, the cassette may move while the platen roller is in contact with the printing tape. Consequently, problems could occur such as the printing tape becoming twisted, or bent.

In view of the foregoing, it is an object of the present disclosure to provide a printing device that can suppress printing tape from having problems as a result of the printing tape being nipped by the platen roller after the cassette has been attached.

In order to attain the above and other objects, the present disclosure provides a printing device including: a housing; a print head; a platen roller; a holder; and a cover. The housing has a cassette attaching opening through which a printing cassette accommodating a printing tape is attachable to the housing. The print head is provided inside the housing. The print head extends toward the cassette attaching opening from an interior of the housing. The platen roller is provided inside the housing. The platen roller faces the print head. The holder holds one of the print head and the platen roller. The holder is movable between a nip position in which the printing tape is nipped between the print head and the platen roller and a non-nip position in which the printing tape is not nipped between the print head and the platen roller. The cover is attachable to the housing. The cover is movable between a covering position in which the cover covers at least part of the cassette attaching opening and an engaged position in which the cover is engaged with the housing. The cover is configured to move between the covering position and the engaged position by rotating about a rotational axis parallel to an attaching direction in which the printing cassette is attached to the housing through the cassette attaching opening. The holder is configured to move from the non-nip position to the nip position in conjunction with movement of the cover from the covering position to the engaged position.

Since the platen roller moves while the cover is covering the cassette attaching opening, this configuration can suppress the user from touching the printing cassette and causing the printing cassette to move while the platen roller is in contact with the printing tape. Thus, problems in the printing tape due to the platen roller nipping the printing tape can be suppressed.

BRIEF DESCRIPTION OF DRAWINGS

The particular features and advantages of the embodiment(s) as well as other objects will become apparent from the following description taken in connection with the accompanying drawings, in which.

DESCRIPTION

1. First Embodiment

1-1. Structure of a Printing Device

Figure 1A:
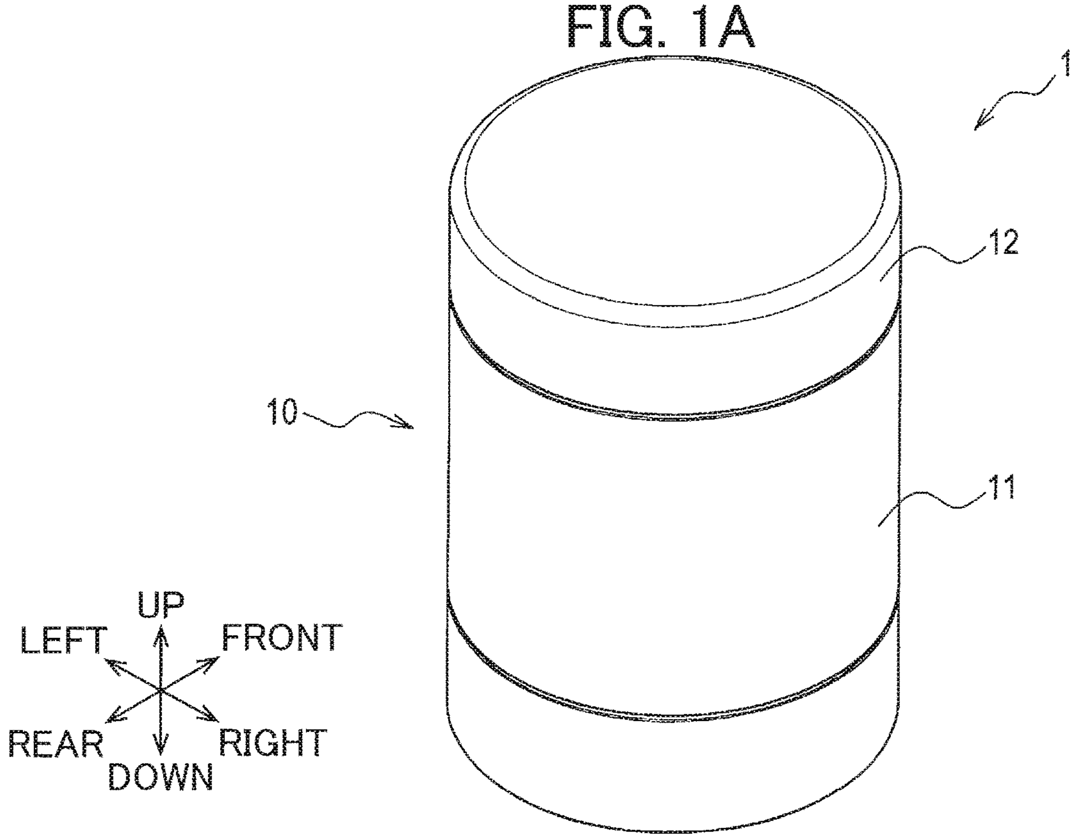
FIG. 1A is a schematic perspective view of a printing device according to one embodiment of the present disclosure.

FIGS. 1A, 1B, 2A, 2B, and 2C illustrate a printing device 1. The printing device 1 is provided with a device body 10, and a printing cassette 100. The printing device 1 prints on a tape-like printing medium. Note that a cover 12 described later has been omitted from FIGS. 2A, 2B, and 2C, excluding pawls 12B.

In the present embodiment, the direction parallel to the rotational axis of a platen roller 15 described later will be called an up-down direction; the direction orthogonal to the up-down direction in which printing tape is discharged from the device body 10 will be called a front-rear direction; and the direction orthogonal to both the up-down direction and front-rear direction will be called the left-right direction.

<Device Body>

Figure 3B:
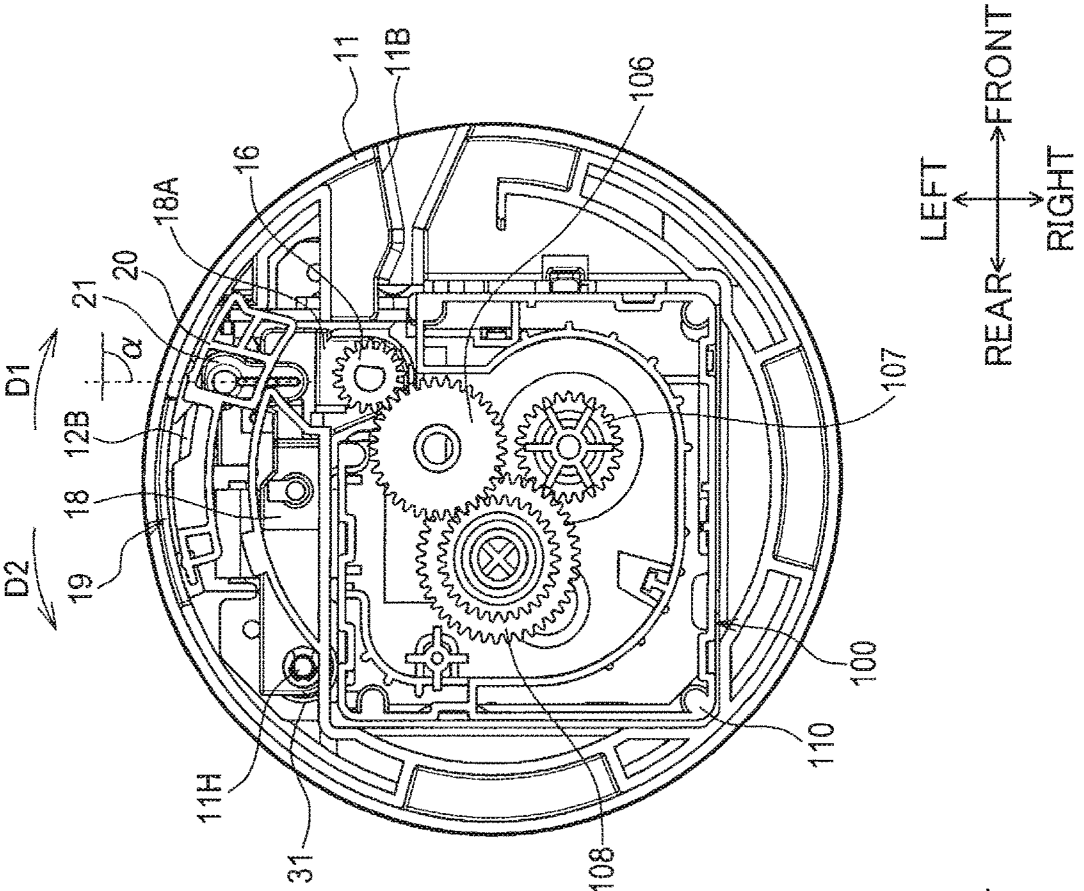
FIG. 3B is a schematic cross-sectional view taken along line IIIB-IIIB depicted in FIG. 2B.
Figure 3A:
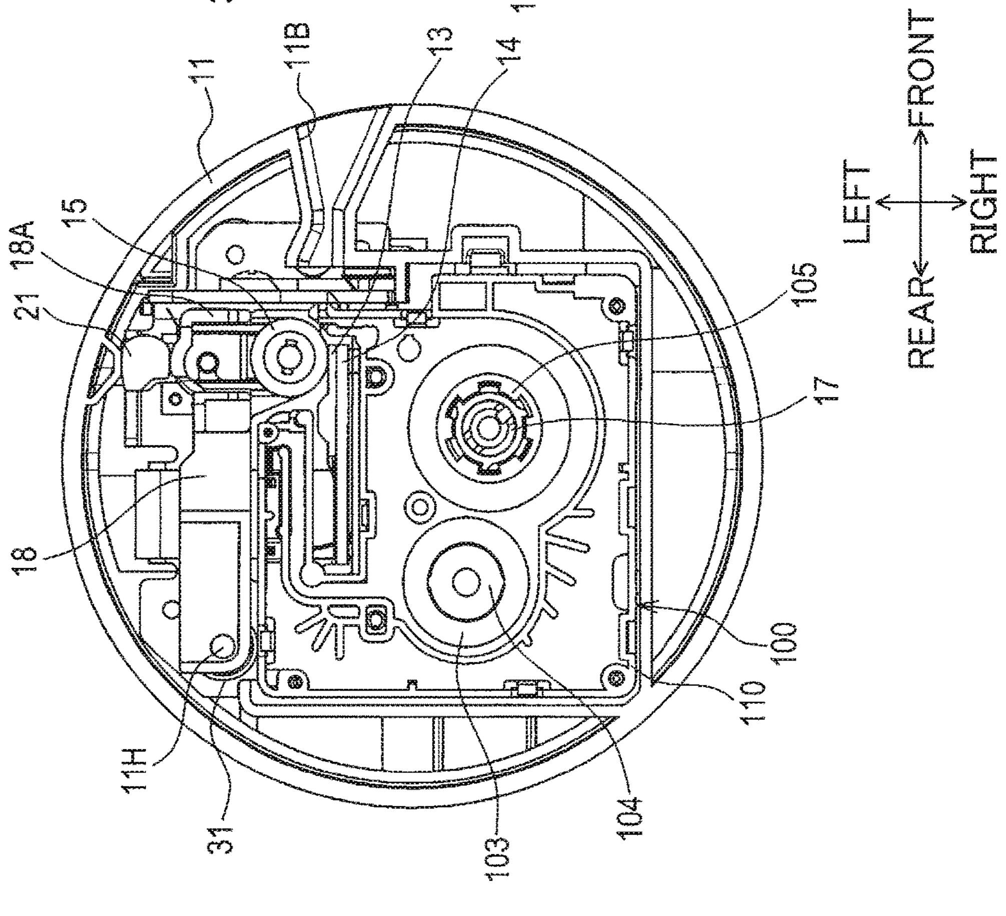
FIG. 3A is a schematic cross-sectional view taken along line IIIA-IIIA depicted in FIG. 2B.

The device body 10 is provided with a housing 11, the cover 12, and a power switch 25. As shown in FIGS. 3A and 3B, the device body 10 is also provided with a print head 13, a head retaining part 14, the platen roller 15, a platen gear 16, a drive shaft 17, a holder 18, and a contact member 19.

<Housing>

Figures 2A, 2B, 2C:
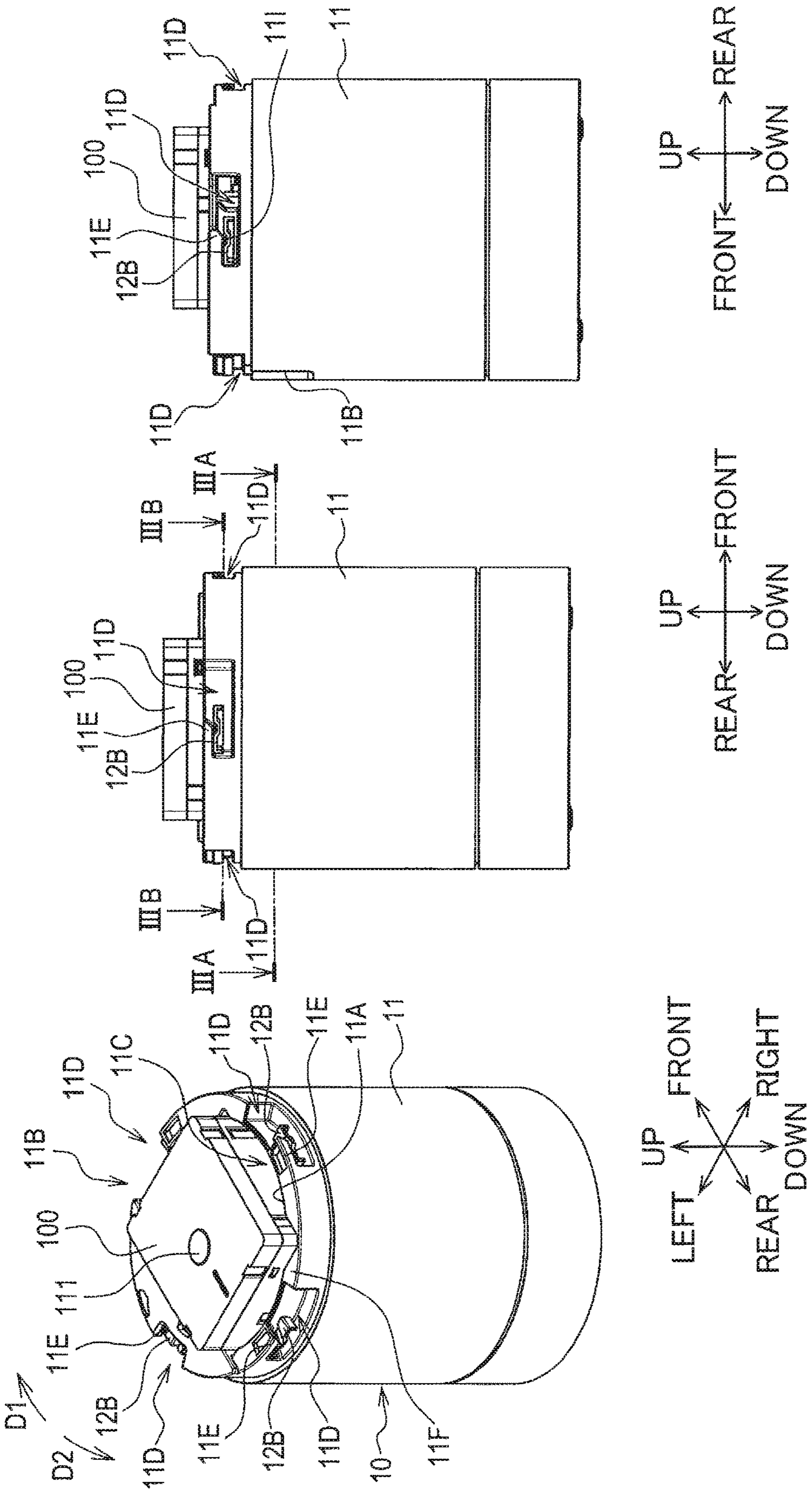
FIG. 2A is a schematic perspective view illustrating a state where a cover of the printing device shown in FIG. 1A is in an engaged position.
FIG. 2B is a schematic right side view of the printing device shown in FIG. 2A.
FIG. 2C is a schematic left side view of the printing device shown in FIG. 2A.

As shown in FIG. 2A, the housing 11 has a cassette attaching opening 11A, a tape outlet 11B, a recess 11C, four grooves 11D, and four engaging parts 11E.

The cassette attaching opening 11A is formed in a top surface 11F of the housing 11. The housing 11 is configured such that the printing cassette 100 accommodating printing tape is attachable to the housing 11 via the cassette attaching opening 11A (i.e., by penetrating the cassette attaching opening 11A).

The tape outlet 11B is formed in the front surface of the housing 11. Printing tape is discharged from the housing 11 to the outside via the tape outlet 11B. The cassette attaching opening 11A and tape outlet 11B are both in communication with the recess 11C.

At least part of the printing cassette 100 is accommodated in the recess 11C. The recess 11C is formed inside the housing 11 and functions to position the printing cassette 100. The printing cassette 100 is attached to the recess 11C by inserting the printing cassette 100 into the recess 11C in the downward direction from a position above the cassette attaching opening 11A toward the bottom of the recess 11C.

The housing 11 in the present embodiment is a columnar shape whose central axis is parallel to the up-down direction. That is, the housing 11 has a circular top surface 11F and a circular bottom surface 11G (see FIG. 1B) that are orthogonal to the up-down direction. The top surface 11F and bottom surface 11G have the same diameter, but the top surface 11F and bottom surface 11G may configured with different diameters. In other words, the housing 11 may have a truncated cone shape.

Each of the four grooves 11D is configured such that one of the pawls 12B on the cover 12 described later can be inserted into the groove 11D from above. Each groove 11D is also configured such that the inserted pawl 12B is movable along the circumferential direction of the top surface 11F (i.e., the circumferential direction of the housing 11). That is, each groove 11D extends in the up-down direction and the circumferential direction of the housing 11 and has an opening that allows the groove 11D to communicate with the area above the housing 11.

The four engaging parts 11E are arranged such that each engaging part 11E overlaps one of the four grooves 11D vertically. In other words, the four engaging parts 11E are arranged such that each engaging part 11E overlaps one of the four grooves 11D as viewed in the up-down direction. At least one of the four engaging parts 11E has a protrusion 11I that protrudes into the groove 11D in the downward direction. This protrusion 11I is configured to engage with one of the pawls 12B of the cover 12 described later. In the present embodiment, a protrusion 11I is provided on only one engaging part 11E. However, protrusions 11I may be provided on all engaging parts 11E. Alternatively, protrusions 11I may be provided on some of the engaging parts 11E.

Each engaging part 11E is arranged in a position offset in the circumferential direction of the housing 11 from the opening through which the corresponding groove 11D is in communication with the area thereabove. In other words, the engaging part 11E covers a portion of the groove 11D in the circumferential direction of the housing 11 from above.

<Cover>

Figure 4:
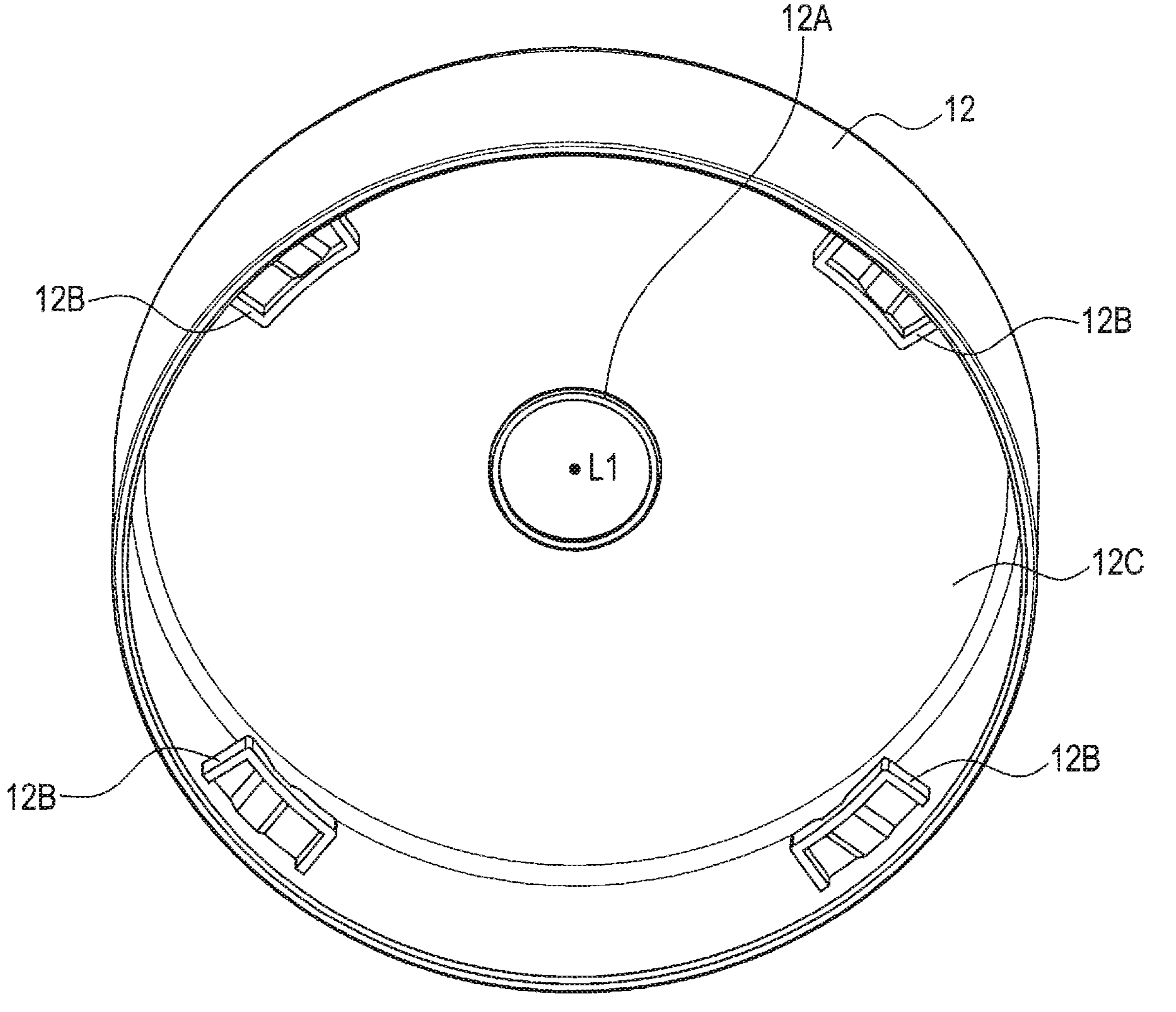
FIG. 4 is a schematic perspective view of the cover of the printing device shown in FIG. 1A.

As shown in FIG. 1A, the cover 12 is attachable to the housing 11 so as to cover the top surface 11F. As shown in FIG. 4, the cover 12 is a cylindrical body that is closed on the top side and open on the bottom.

The cover 12 is attached to and detached from the housing 11 by rotating the cover 12 about a rotational axis L1. The rotational axis L1 of the cover 12 extends in the up-down direction and passes through the center of the cover 12. The rotational axis L1 of the cover 12 is parallel to the downward direction, i.e., the attaching direction in which the printing cassette 100 is attached to the housing 11 through the cassette attaching opening 11A. The cover 12 has a pressing part 12A, and the four pawls 12B.

The cover 12 is movable between a covering position and an engaged position by rotating the cover 12 about the rotational axis L1. In the covering position, the cover 12 covers at least part of the cassette attaching opening 11A (the entire cassette attaching opening 11A in the present embodiment). In the engaged position, the cover 12 is engaged with the housing 11. In the following description, the clockwise direction when viewing the device body 10 from above will be called a first rotating direction D1, while the counterclockwise direction will be called a second rotating direction D2. In the present embodiment, the cover 12 is movable from the covering position to the engaged position by rotating the cover 12 about the rotational axis L1 in the first rotating direction D1.

The pressing part 12A is configured to press the printing cassette 100 in the downward direction (i.e., in the attaching direction for attaching the printing cassette 100) when the cover 12 is in the engaged position or between the covering position and the engaged position. The pressing part 12A is constantly in contact with a pressure-receiving part 111 of the printing cassette 100 described later while the cover 12 moves from the covering position to the engaged position.

The pressing part 12A protrudes from a top inner surface 12C of the cover 12 in the downward direction. The pressing part 12A is arranged in a position separated from the rotational axis L1 of the cover 12 in a direction orthogonal to the rotational axis L1 (i.e., in the front-rear direction and left-right direction in a state where the cover 12 is attached to the housing 11).

Specifically, the pressing part 12A has a cylindrical shape whose axial direction is parallel to the rotational axis L1 of the cover 12. The pressing part 12A is arranged so as to surround the rotational axis L1. That is, the pressing part 12A is separated from the rotational axis L1 in the radial direction of the cover 12 (i.e., the radial direction of the housing 11 in a state where the cover 12 is attached to the housing 11).

In a state where the cover 12 is attached to the housing 11 (i.e., when the cover 12 is in the engaged position), each of the four paws 12B overlaps one of the four engaging parts 11E of the housing 11 in the up-down direction. In other words, in a state where the cover 12 is attached to the housing 11, each of the four paws 12B overlaps one of the four engaging parts 11E as viewed in the up-down direction. The four pawls 12B are arranged at equal intervals along the rotating direction (i.e., the circumferential direction) of the cover 12.

Figure 5C:
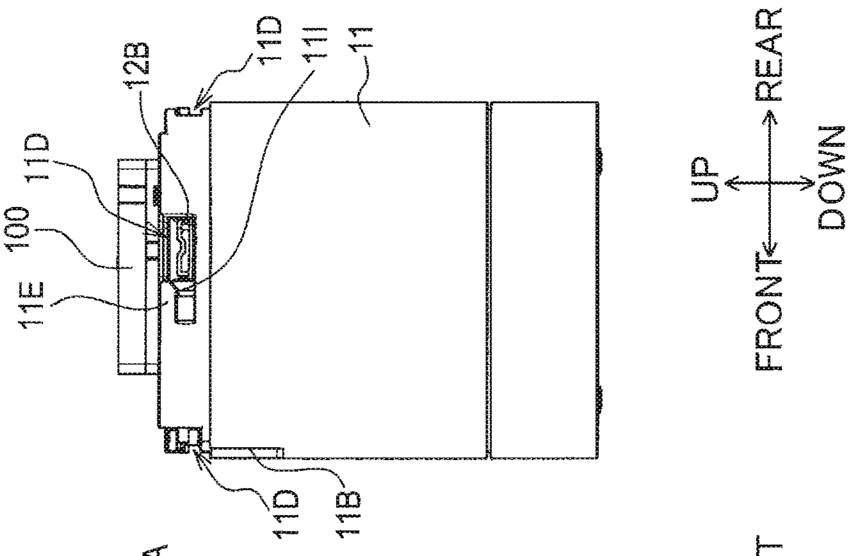
FIG. 5C is a schematic left side view of the printing device shown in FIG. 5A.
Figure 5B:
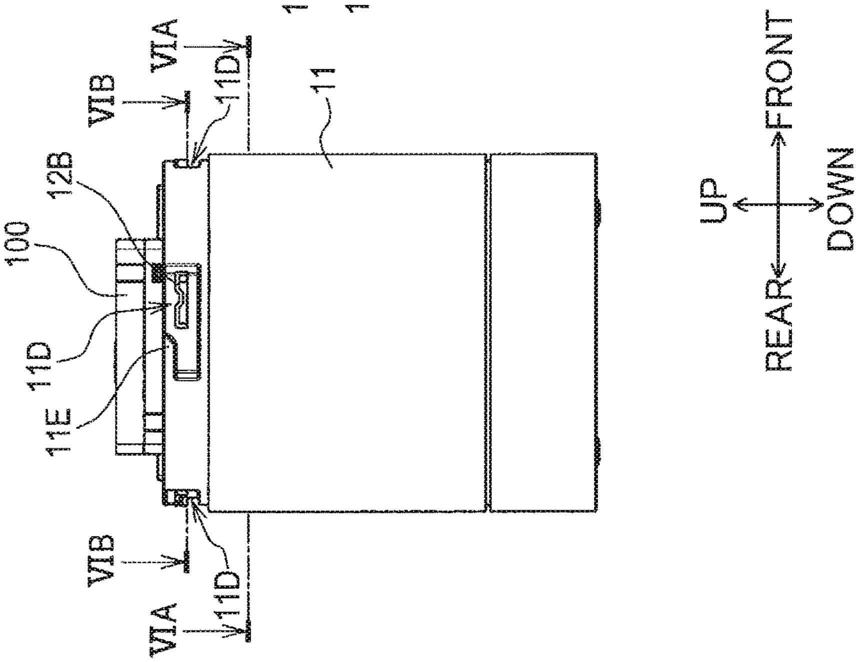
FIG. 5B is a schematic right side view of the printing device shown in FIG. 5A.
Figure 5A:
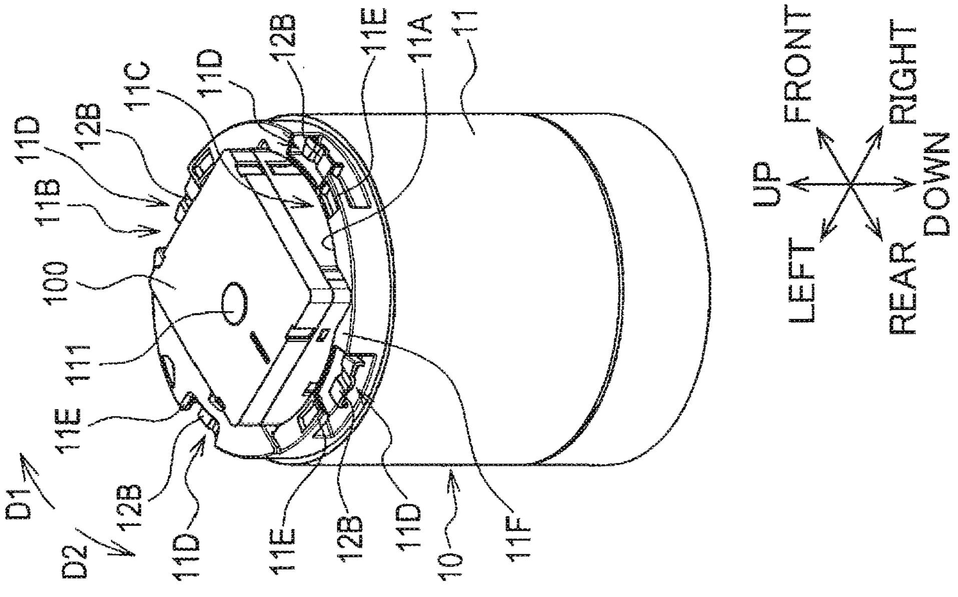
FIG. 5A is a schematic perspective view illustrating a state where the cover of the printing device shown in FIG. 1A is in a covering position.

When the cover 12 is in the covering position, each of the four pawls 12B of the cover 12 is inserted into the corresponding one of the four groove 11D from above, as illustrated in FIGS. 5A, 5B, and 5C. When the cover 12 is rotated in the first rotating direction D1 from this covering position, each pawl 12B moves in the first rotating direction D1 within the corresponding groove 11D. Note that, as in FIGS. 2A, 2B, and 2C, the cover 12 is omitted from FIGS. 5A, 5B, and 5C, except for the pawls 12B.

While moving in the first rotating direction D1, each of the four pawls 12B comes to overlap the corresponding engaging part 11E in the groove 11D in the up-down direction (i.e., as viewed in the up-down direction). Further, each of the four pawls 12B has a recess into which the protrusion 11I of the engaging part 11E can be fitted.

When the cover 12 is in the engaged position, the recess in at least one of the pawls 12B vertically overlaps the engaging part 11E that possesses the protrusion 11I, as illustrated in FIGS. 2A, 2B, and 2C. Accordingly, this pawl 12B becomes engaged with the engaging part 11E, thereby restricting movement of the pawl 12B. As a result, the cover 12 is locked in the engaged position.

<Print Head>

The print head 13 shown in FIG. 3A is a device for printing on the printing tape retained by the printing cassette 100.

The print head 13 is provided inside the housing 11 and extends toward the cassette attaching opening 11A from the interior of the housing 11. Specifically, the print head 13 has a plate shape whose thickness dimension is parallel to the left-right direction.

The print head 13 has a plurality of heating elements. The heating of each heating element is controlled individually. The printing tape conveyed to a position overlapping the print head 13 by the platen roller 15 described later is pressed through an ink ribbon against the print head 13 whose heating elements are generating heat. As a result, some ink provided on the surface of the ink ribbon is transferred onto the printing tape for printing characters, symbols, and the like on the printing tape.

<Head Retaining Part>

The head retaining part 14 retains the print head 13. The head retaining part 14 is a metal plate whose thickness dimension is parallel to the left-right direction. The print head 13 is mounted on the left side surface of the plate. The head retaining part 14 also functions as a heat sink for dissipating heat from the print head 13.

<Platen Roller>

The platen roller 15 is a roller for conveying printing tape from the printing cassette 100 toward the outside. The rotational axis of the platen roller 15 is parallel to the up-down direction.

Figure 6B:
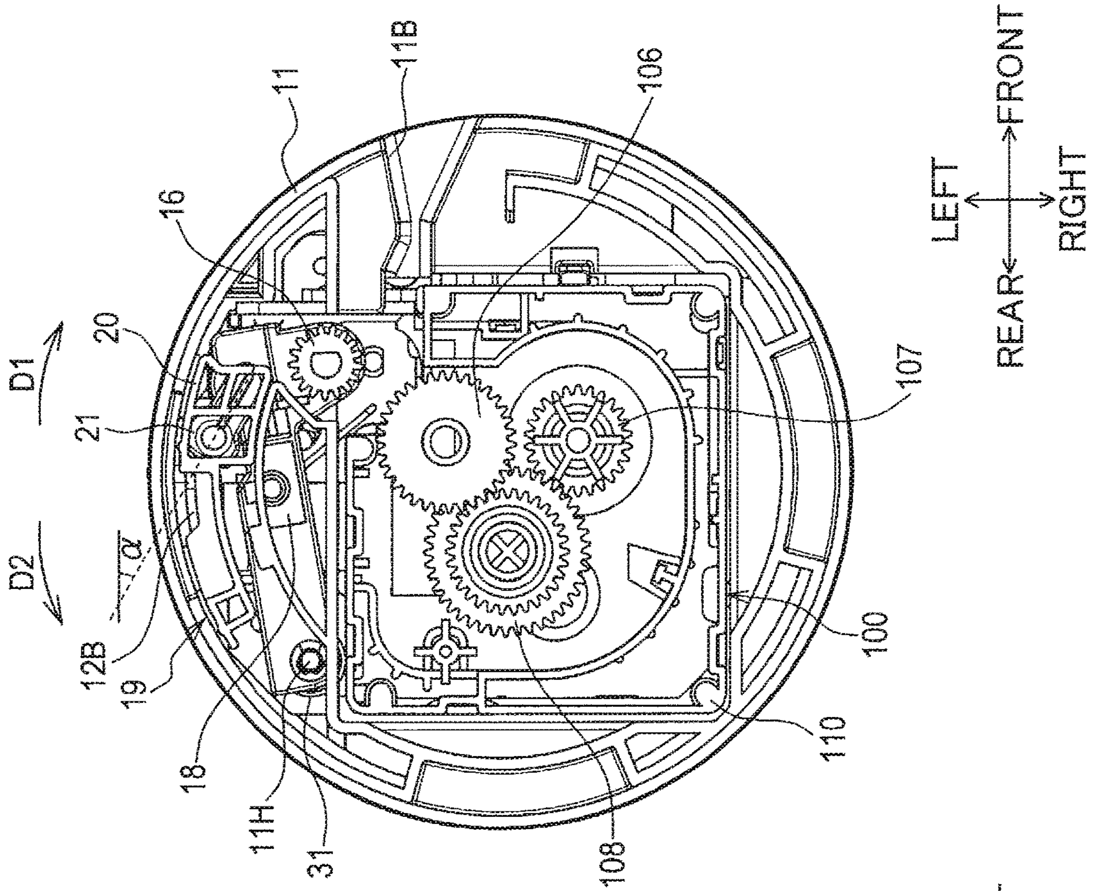
FIG. 6B is a schematic cross-sectional view taken along line VIB-VIB depicted in FIG. 5B.
Figure 6A:
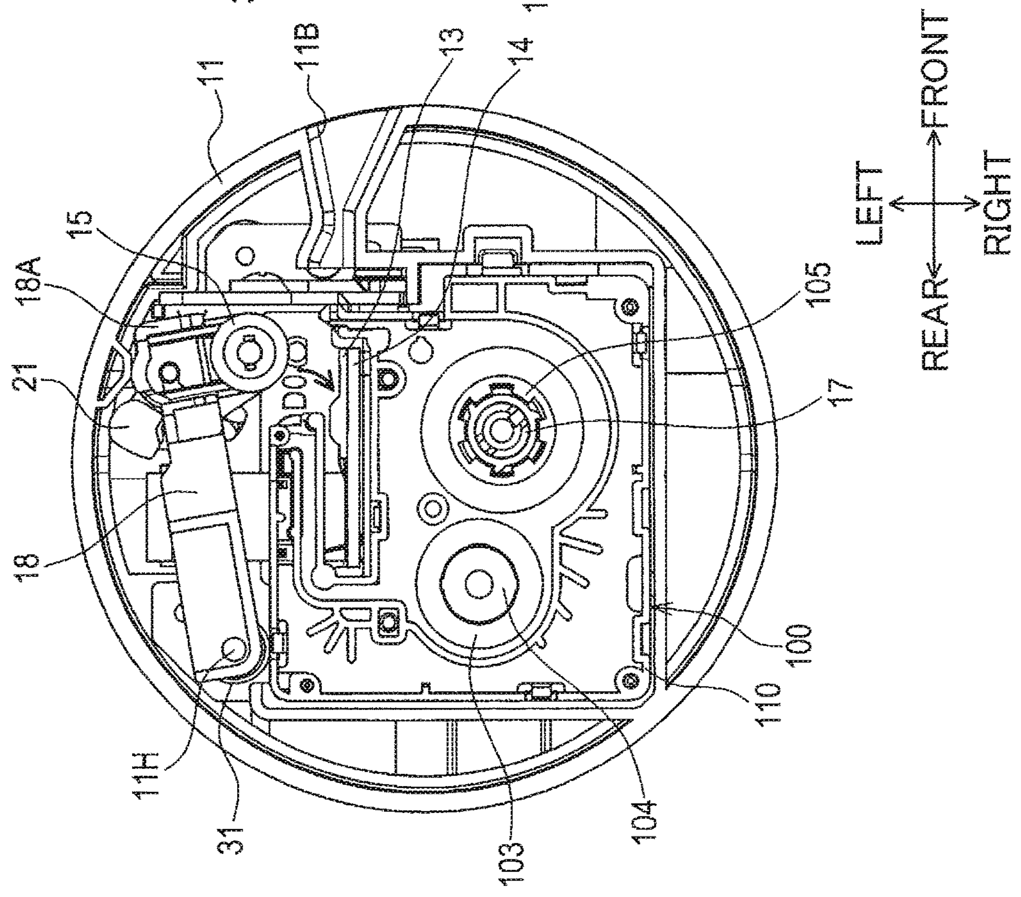
FIG. 6A is a schematic cross-sectional view taken along line VIA-VIA depicted in FIG. 5B.

The platen roller 15 is provided inside the housing 11 so as to face the print head 13. The platen roller 15 is movable between a position separated from the print head 13, as shown in FIG. 6A, and a position for pressing (i.e., nipping) the printing tape against the print head 13, as shown in FIG. 3A.

<Platen Gear>

The platen gear 16 is provided inside the housing 11 and is drivingly coupled to the platen roller 15. The platen gear 16 is movable between a position separated from an output gear 106 of the printing cassette 100 described later, as shown in FIG. 6B, and a position for engaging with the output gear 106, as shown in FIG. 3B. In the present embodiment, the rotational axis of the platen gear 16 is arranged collinearly with the rotational axis of the platen roller 15.

<Drive Shaft>

Figure 7:
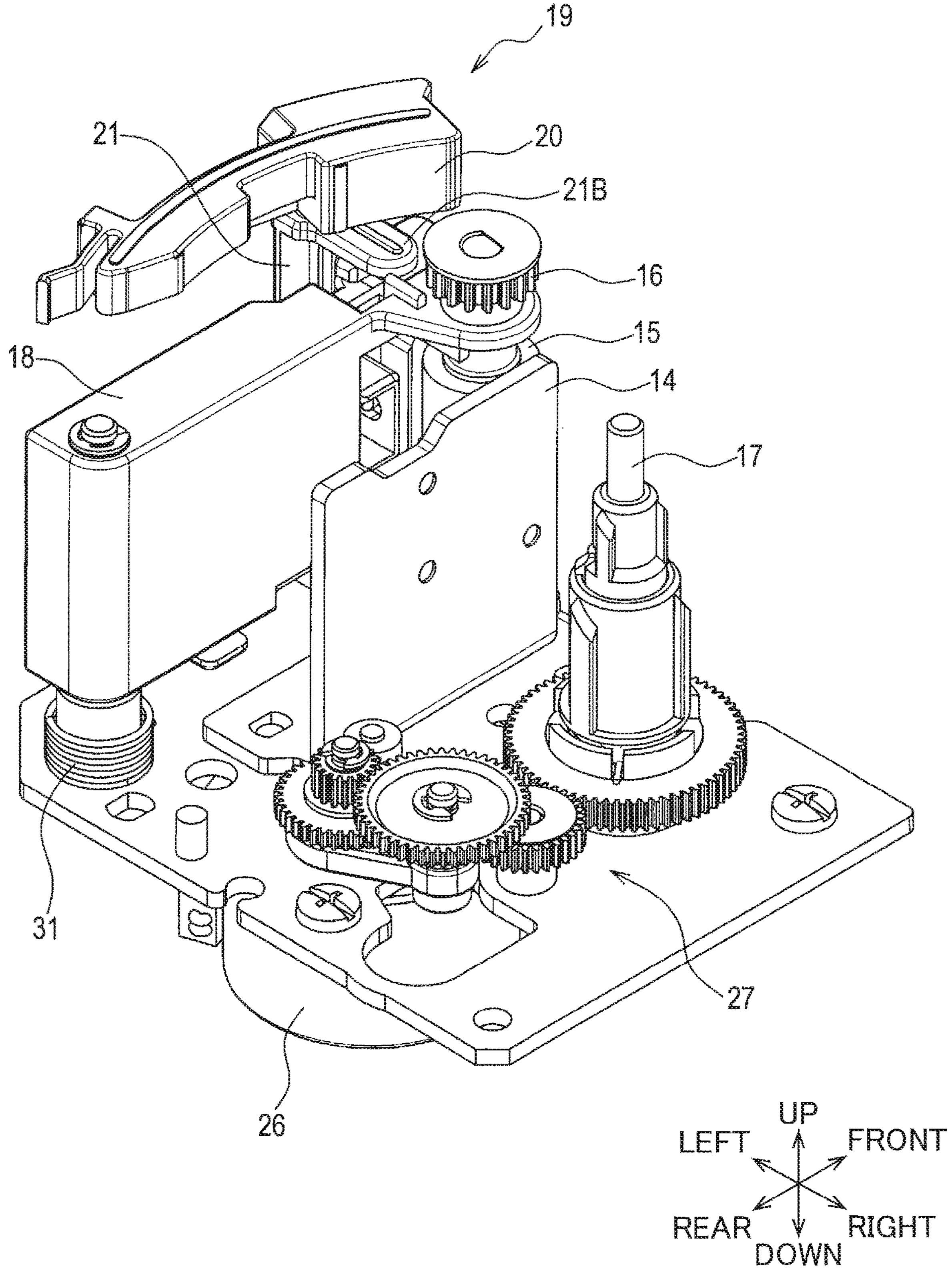
FIG. 7 is a schematic perspective view of the internal structure of a housing of the printing device shown in FIG. 1A in a state where the cover is in the engaged position.

As shown in FIG. 3A, the drive shaft 17 is provided inside the housing 11. The rotational axis of the drive shaft 17 is parallel to the up-down direction. As shown in FIG. 7, the drive shaft 17 is rotated about its rotational axis by the drive force of a drive source 26 (e.g., a motor). The drive force of the drive source 26 is transmitted to the drive shaft 17 through a drive transmission mechanism 27 that includes a plurality of gears.

In a state where the printing cassette 100 is attached to the housing 11, the drive shaft 17 is inserted into an input spool 105 (described later) of the printing cassette 100 and engages with an input gear 107 (described later), as shown in FIG. 3A. In this state, the drive shaft 17 rotates the input spool 105 and input gear 107.

<Holder>

The holder 18 is a member that switches the nipped state of the printing tape by changing the relative positions of the print head 13 and platen roller 15.

Specifically, the holder 18 holds the platen roller 15 and is movable between a nip position (see FIG. 3A) in which the printing tape is nipped between the print head 13 and platen roller 15, and a non-nip position (see FIG. 6A) in which the printing tape is not nipped between the print head 13 and platen roller 15.

Specifically, the holder 18 is mounted on a shaft 11H provided in the left-rear region inside the housing 11. The holder 18 is pivotally movable relative to the housing 11 about a pivot axis parallel to the up-down direction.

The platen roller 15 and platen gear 16 are rotatably mounted on a front end 18A (i.e., the opposite end from the shaft 11H in the front-rear direction) of the holder 18. The platen gear 16 is separated from the output gear 106 when the holder 18 is in the non-nip position and is engaged with the output gear 106 when the holder 18 is in the nip position.

As shown in FIG. 6A, the direction in which the holder 18 pivotally moves from the non-nip position toward the nip position will be called a pivoting direction D0. The pivoting direction D0 of the holder 18 intersects the attaching direction for attaching the printing cassette 100 to the housing 11 (i.e., the direction for inserting the printing cassette 100 through the cassette attaching opening 11A, or the downward direction). The entire holder 18 is always positioned inward of (i.e., inside) the outer surface of the housing 11.

The holder 18 moves from the non-nip position to the nip position in conjunction with movement of the cover 12 from the covering position to the engaged position. Specifically, the holder 18 is moved from the non-nip position toward the nip position by movement of the contact member 19.

A torsion coil spring 31 is wound around the shaft 11H of the housing 11. One end of the torsion coil spring 31 is coupled with the holder 18. The torsion coil spring 31 urges the holder 18 from the nip position toward the non-nip position (i.e., toward the outside of the housing 11). The holder 18 moves from the nip position toward the non-nip position in conjunction with movement of the cover 12 from the engaged position toward the covering position.

<Contact Member>

The contact member 19 is configured to contact one of the four pawls 12B of the cover 12. The contact member 19 is movable between a pressing position (see FIG. 3B) in which the contact member 19 presses the holder 18 toward the nip position, and a non-pressing position (see FIG. 6B) in which the contact member 19 does not press the holder 18.

The contact member 19 is configured to move from the non-pressing position to the pressing position in conjunction with movement of the cover 12 from the covering position to the engaged position (i.e., in conjunction with movement of the pawls 12B in the first rotating direction D1). Further, the contact member 19 is configured to move from the pressing position to the non-pressing position in conjunction with movement of the cover 12 from the engaged position to the covering position (i.e., in conjunction with movement of the pawls 12B in the second rotating direction D2).

The contact member 19 includes a pivoting part 20, and a converting part 21. As shown in FIGS. 7 and 8A, the pivoting part 20 extends along the rotating direction of the cover 12. The pivoting part 20 is provided outward of the holder 18 in the radial direction of the housing 11.

The pivoting part 20 is configured to pivotally move together with the pawl 12B about the rotational axis L1. Specifically, in accordance with movement of the pawl 12B in the first rotating direction D1, the pivoting part 20 is pressed by the pawl 12B to move in the first rotating direction D1 from the position shown in FIG. 6B to the position shown in FIG. 3B.

The converting part 21 is coupled to the pivoting part 20 so as to be rotatable relative to the pivoting part 20 about an axis parallel to the up-down direction. The converting part 21 is also coupled to the holder 18 so as to be rotatable relative to the holder 18 about an axis parallel to the up-down direction. That is, the converting part 21 constitutes a link connecting the pivoting part 20 to the holder 18.

Figure 8B:
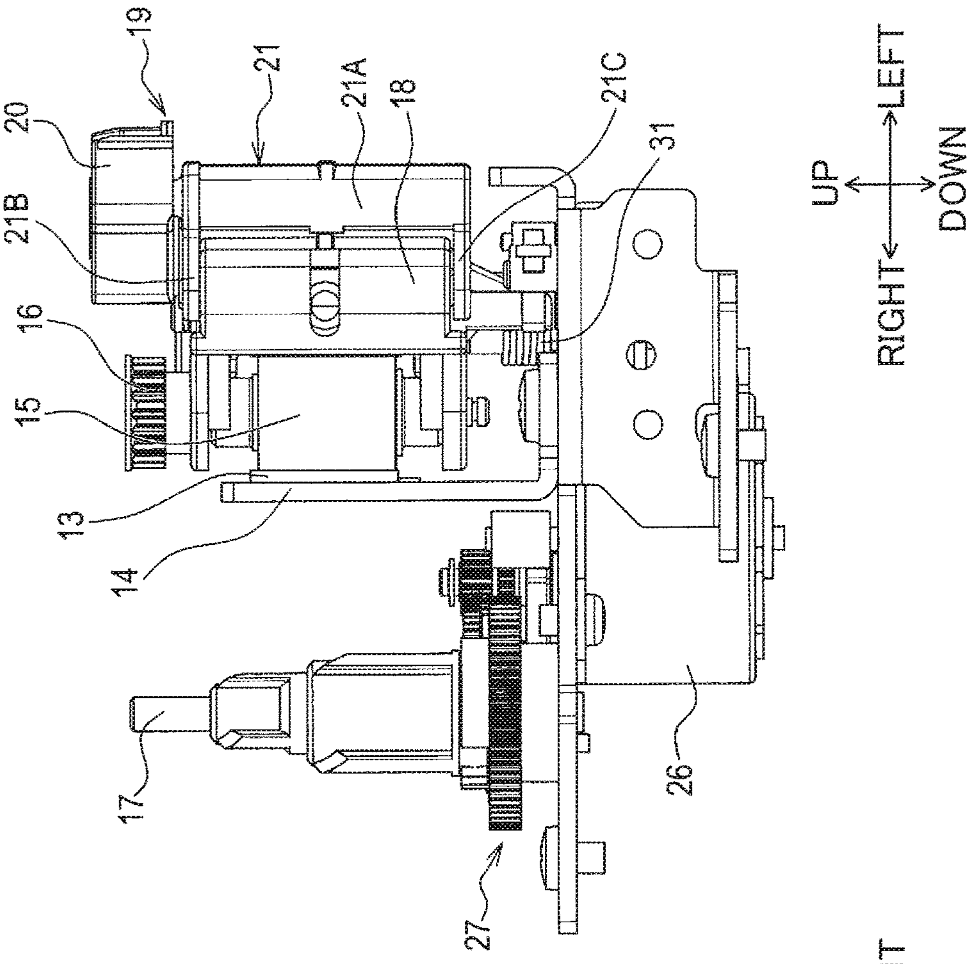
FIG. 8B is a schematic front view of the internal structure shown in FIG. 7.
Figure 8A:
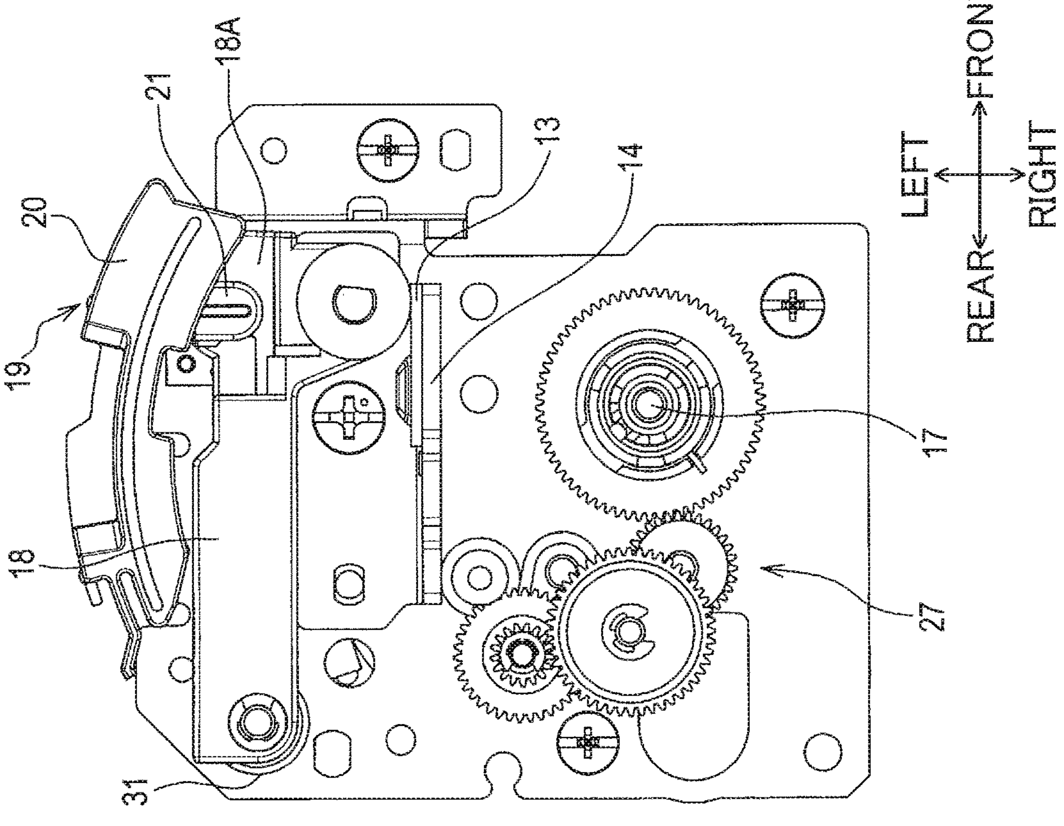
FIG. 8A is a schematic plan view of the internal structure shown in FIG. 7.

As shown in FIG. 8B, the converting part 21 includes a base part 21A coupled to the pivoting part 20, and a first plate part 21B and second plate part 21C respectively arranged above and below a portion of the holder 18 with the portion of the holder 18 interposed therebetween. The first plate part 21B and second plate part 21C extend toward the holder 18 from the respective upper end and lower end of the base part 21A and are rotatably coupled to the front end 18A of the holder 18.

Figure 9:
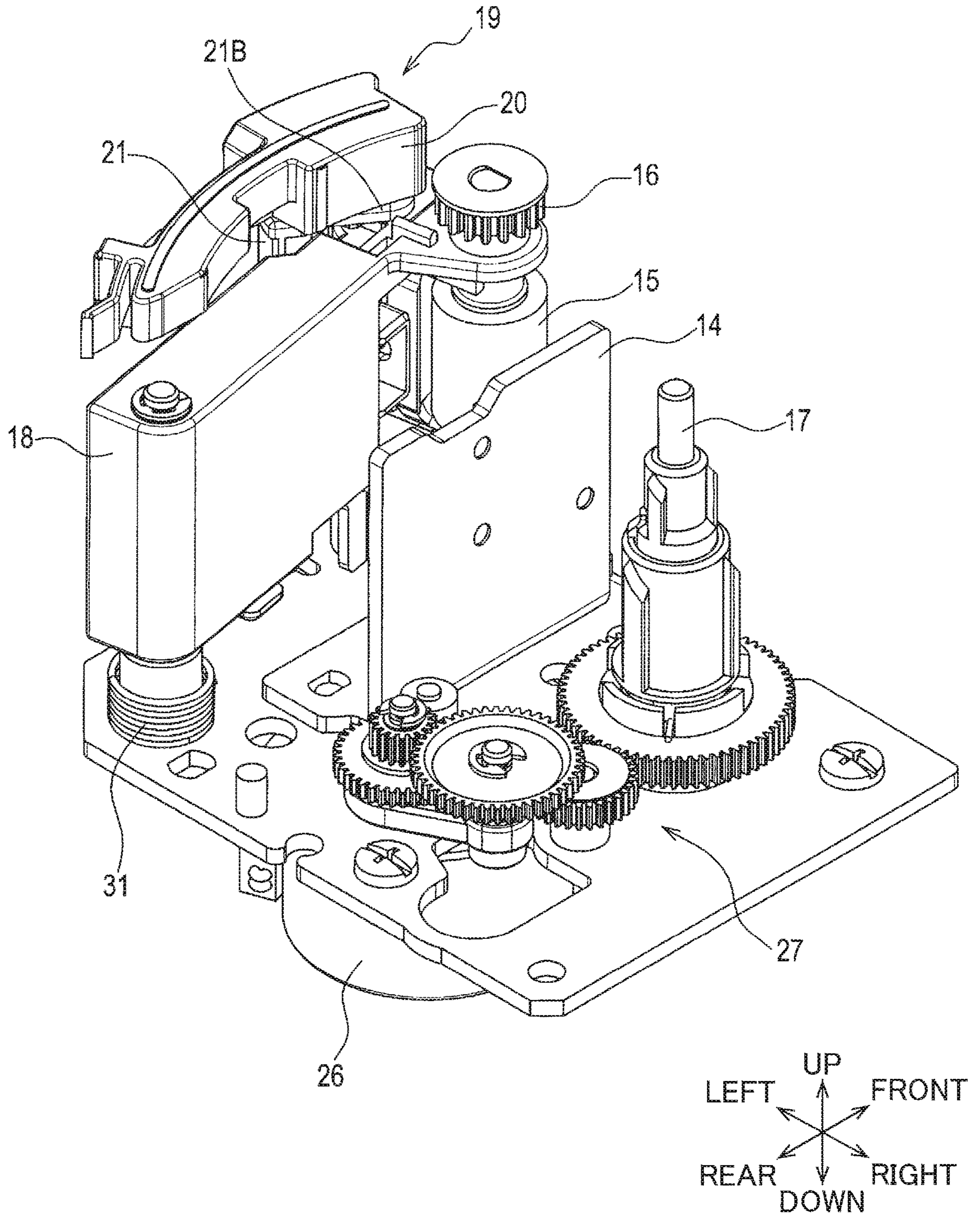
FIG. 9 is a schematic perspective view of the internal structure of the housing of the printing device shown in FIG. 1A in a state where the cover is in the covering position.
Figure 10B:
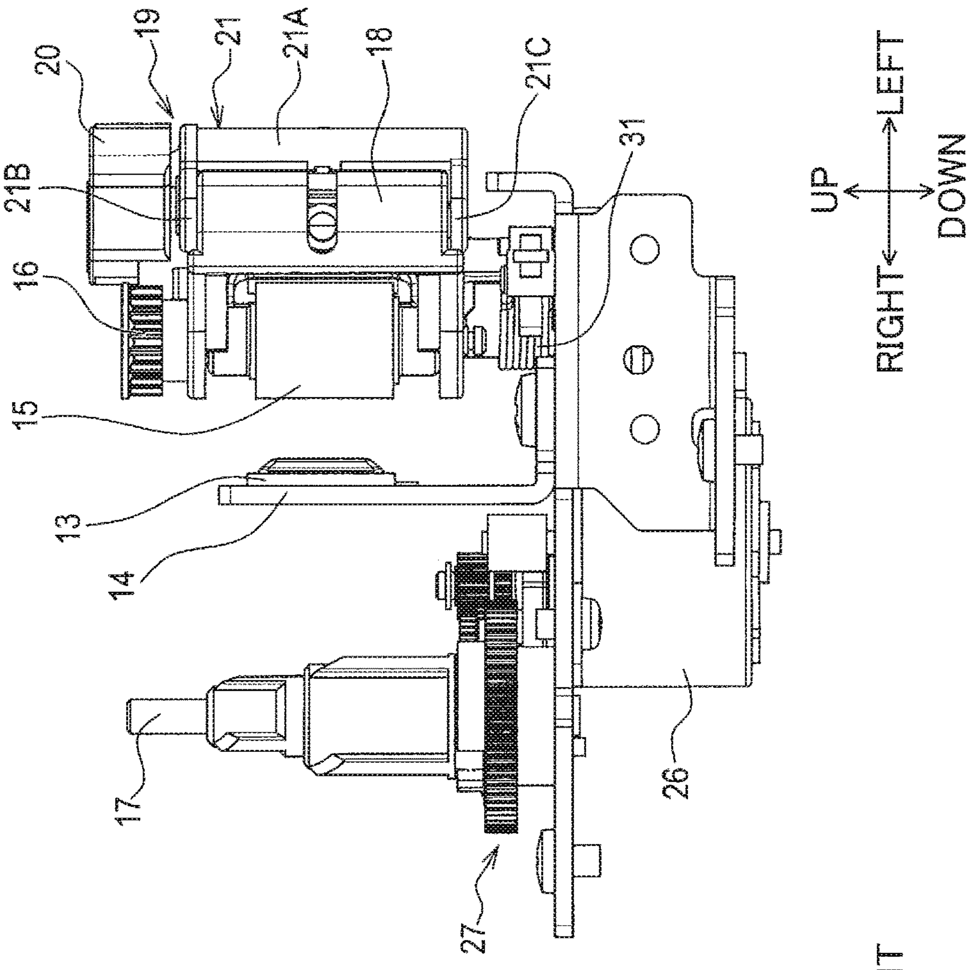
FIG. 10B is a schematic front view of the internal structure shown in FIG. 9.
Figure 10A:
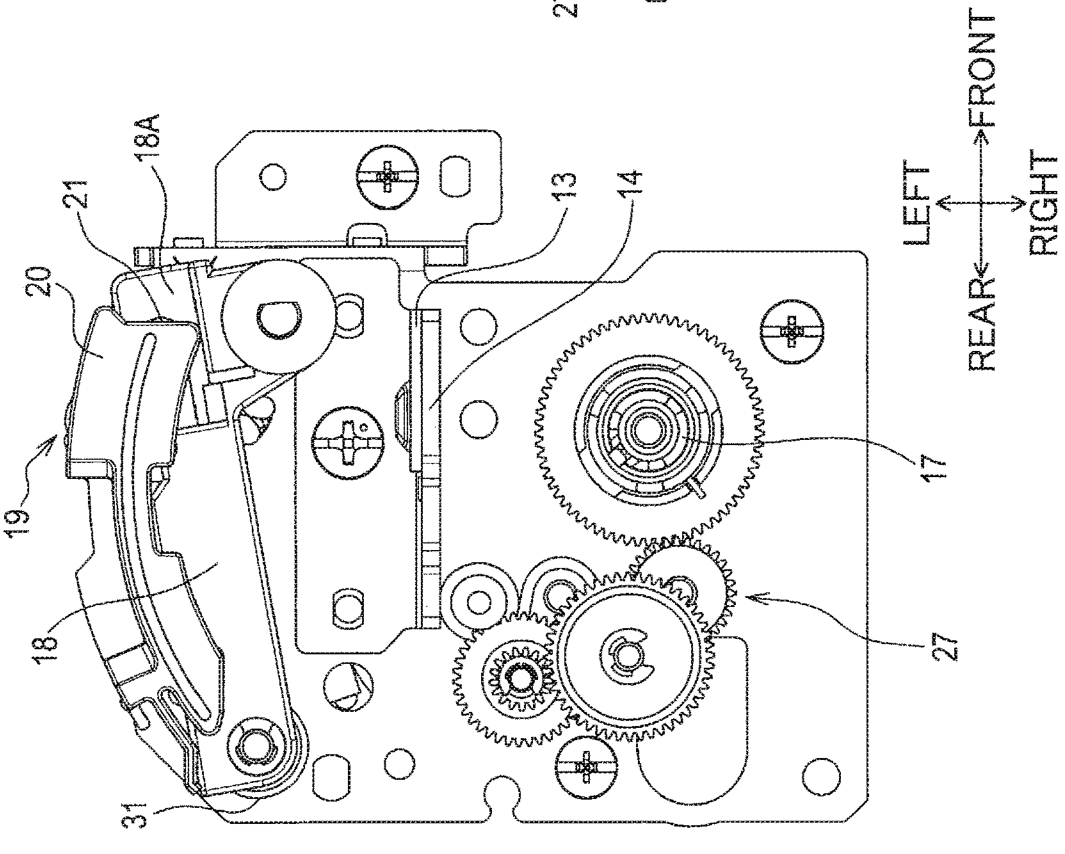
FIG. 10A is a schematic plan view of the internal structure shown in FIG. 9.

The converting part 21 is configured to convert pivotal movement (i.e., movement along the circumferential direction of the housing 11 in the first rotational direction D1) of the pawl 12B contacting the pivoting part 20 into movement of the holder 18 from the non-nip position to the nip position. As shown in FIGS. 9, 10A, and 10B, the acute angle $\alpha$ formed by the front-rear direction and a line connecting the two rotational center axes of the converting part 21 (i.e., the linking direction) is smaller when the holder 18 is in the non-nip position (see FIG. 6B) than when the holder 18 is in the nip position (see FIG. 3B).

When the holder 18 is in the non-nip position, the first plate part 21B and the second plate part 21C move toward the inward of the radial direction of the housing 11 in conjunction with pivotal movement of the base part 21A accompanying pivotal movement of the pivoting part 20 in the first rotating direction D1. As a result, the first plate part 21B and second plate part 21C push the front end 18A of the holder 18 radially inward to move the holder 18 toward the nip position.

<Power Switch>

Figure 1B:
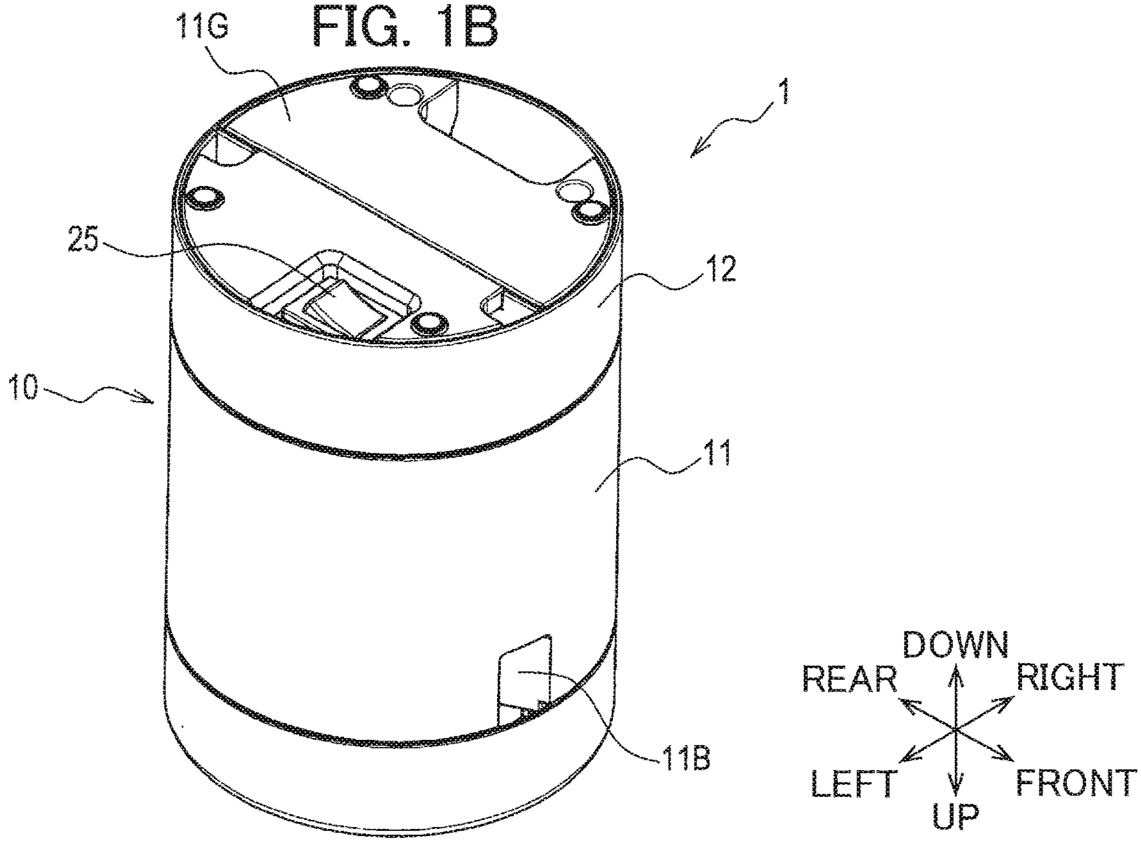
FIG. 1B is another schematic perspective view of the printing device.

The power switch 25 shown in FIG. 1B switches the power supply to the drive source 26 of the printing device 1 on and off. The power switch 25 is provided on the bottom surface 11G of the housing 11 opposite the top surface 11F in which the cassette attaching opening 11A is formed. The top surface 11F is an example of the "first surface". The bottom surface 11G is an example of the "second surface".

<Printing Cassette>

The printing cassette 100 accommodates a printing medium therein. The printing cassette 100 is detachably attachable to the device body 10. Printing cassettes 100 can be replaced to replenish the printing medium and to change the type of print media (e.g., the color, material, etc.).

Figure 11:
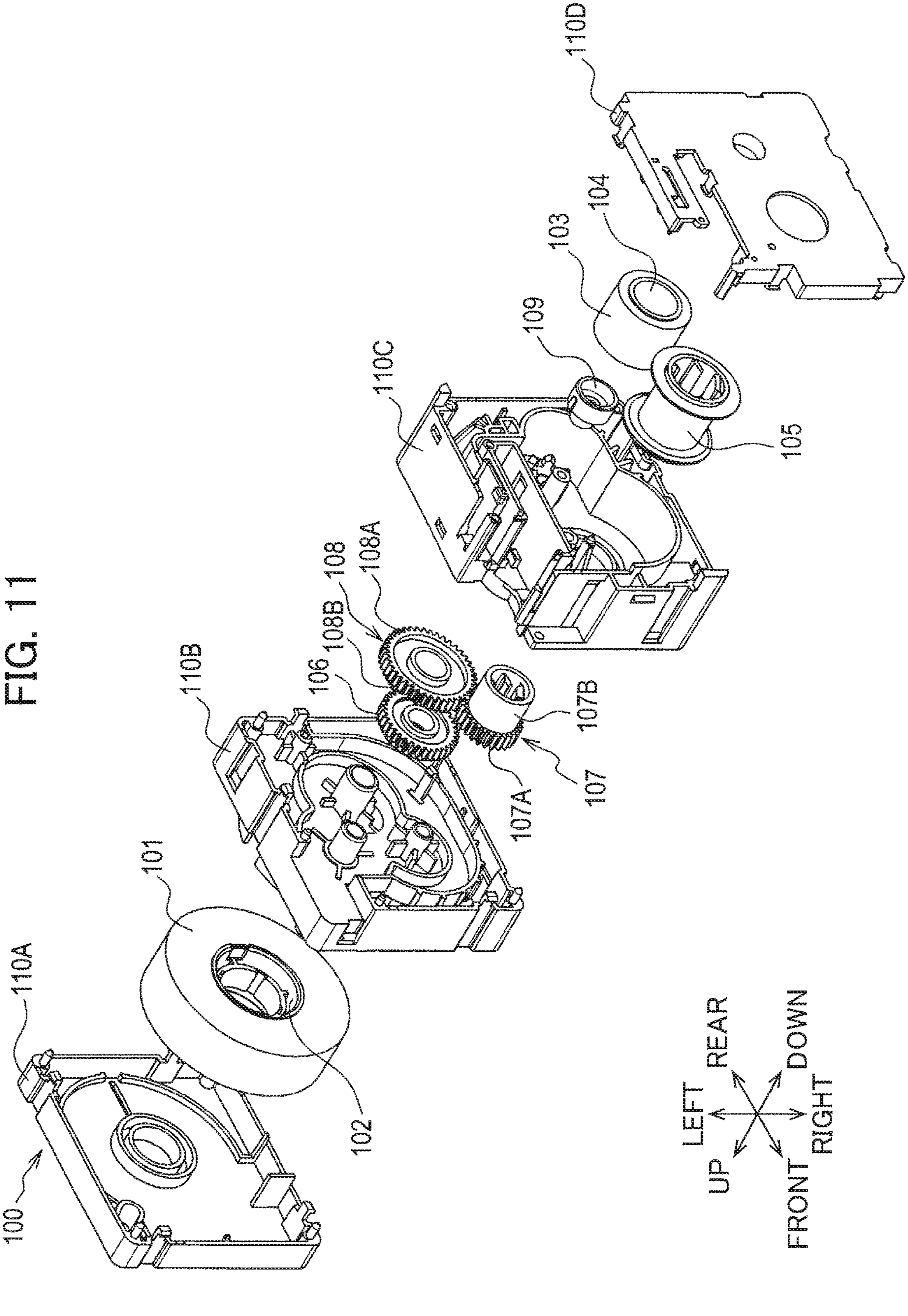
FIG. 11 is a schematic exploded perspective view of a printing cassette attachable to the printing device shown in FIG. 1A.

As shown in FIG. 11, the printing cassette 100 is provided with a case 110, a first roll 101, a first supply spool 102, a second roll 103, a second supply spool 104, the input spool 105, the output gear 106, the input gear 107, an idle gear 108, and a clutch spring holder 109.

<Case>

The case 110 accommodates the rolls, spools, and gears. The case 110 is a rectangular parallelepiped shape having sides that are parallel to the up-down direction, sides that are parallel to the front-rear direction, and sides that are parallel to the left-right direction. Accordingly, the printing cassette 100 in the present embodiment has a rectangular parallelepiped shape. The case 110 is configured of a first part 110A, a second part 110B, a third part 110C, and a fourth part 110D that are assembled together in the up-down direction.

As shown in FIG. 2A, the case 110 includes the pressure-receiving part 111 configured to receive pressure from the pressing part 12A of the cover 12 in a state where the printing cassette 100 is attached to the device body 10. The pressure-receiving part 111 is disposed on the top surface of the case 110. The upper end of the pressure-receiving part 111 is positioned above the upper end of the housing 11 in a state where the printing cassette 100 is attached to the device body 10 (specifically, to the housing 11).

<First Roll>

The first roll 101 shown in FIG. 11 is configured of a printing tape that has been wound about the first supply spool 102. Printing is performed on the printing tape. Printing is performed on the surface of the printing tape using the print head 13 of the device body 10 and an ink ribbon.

<First Supply Roll>

The first supply spool 102 is rotatable about a rotational axis. The first supply spool 102 supplies printing tape to the print head 13 by rotating as the platen roller 15 of the device body 10 feeds the printing tape.

<Second Roll>

The second roll 103 is configured of an ink ribbon that has been wound about the second supply spool 104. The ink ribbon is used for printing on the printing tape.

The ink ribbon is overlaid on the printing tape and supplied for printing by the print head 13. Ink ribbon that has been used in printing is taken up by the input spool 105. A clutch spring retained in the clutch spring holder 109 applies rotational resistance to the second roll 103.

<Second Supply Roll>

The second supply spool 104 is rotatable about a rotational axis. The second supply spool 104 supplies ink ribbon to the print head 13 by rotating as the input spool 105 takes up the ink ribbon.

<Input Spool>

The input spool 105 is rotatable about a rotational axis. Splines are provided on the inner circumferential surface of the input spool 105. The drive shaft 17 of the device body 10 is configured to be coupled with the splines. The input spool 105 takes up ink ribbon by being rotated by the drive shaft 17.

<Output Gear>

The output gear 106 is a gear for externally outputting a drive force for feeding the printing tape. The output gear 106 transmits a drive force to the platen roller 15 via the platen gear 16 of the device body 10.

Part of the output gear 106 is positioned outside the case 110. In a state where the printing cassette 100 is attached to the device body 10, the output gear 106 engages with the platen gear 16.

<Input Gear>

The input gear 107 is engaged indirectly with the output gear 106 via the idle gear 108 and transmits a drive force to the output gear 106. The drive force is inputted into the input gear 107 from the drive source 26 in the device body 10.

The input gear 107 has an external gear 107A, and a cylindrical spool 107B that is fixed to the external gear 107A. The spool 107B has splines on the inner circumferential surface thereof. The external gear 107A rotates together with the spool 107B by a drive force inputted into the spool 107B.

The rotational axis of the input gear 107 passes through the hollow portion of the input spool 105. Hence, the drive shaft 17 is inserted simultaneously through the input spool 105 and input gear 107. As a result, although not directly coupled to the input spool 105, the input gear 107 is rotated by the drive source 26 (i.e., the drive shaft 17), which is common to the input spool 105.

<Idle Gear>

The idle gear 108 is drivingly coupled to (i.e., engaged with) both the input gear 107 and output gear 106 and transmits the drive force inputted into the input gear 107 to the output gear 106.

The idle gear 108 is a two-stage gear provided with a first gear 108A engaged with the input gear 107, and a second gear 108B engaged with the output gear 106. The first gear 108A and second gear 108B are coaxially juxtaposed. The second gear 108B has a smaller diameter than the diameter of the first gear 108A.

In a state where the printing cassette 100 is attached to the device body 10, the drive shaft 17 engages with the input gear 107, and the platen gear 16 engages with the output gear 106. When the drive shaft 17 rotates the input gear 107 in this attached state of the printing cassette 100, the output gear 106 rotates, this rotation of the output gear 106 rotates the platen gear 16, and this rotation of the platen gear 16 rotates the platen roller 15.

<Attachment and Detachment of the Printing Cassette>

Next, the procedure for attaching the printing cassette 100 to the device body 10 will be described. First, while the cover 12 is removed from the housing 11, the printing cassette 100 is inserted through the cassette attaching opening 11A from above.

In this state (i.e., while the cover 12 is neither in the covering position nor the engaged position), the contact member 19 is in the non-pressing position shown in FIG. 9. Further, the holder 18 is in the non-nip position.

After inserting the printing cassette 100, the four pawls 12B are inserted into the corresponding grooves 11D of the housing 11 from above as shown in FIG. 5A, so that the cover 12 is placed in the covering position for covering the cassette attaching opening 11A. At this point, the contact member 19 is still in the non-pressing position.

Next, the cover 12 is rotated in the first rotating direction D1 until reaching the engaged position shown in FIG. 2A, causing the four pawls 12B to advance in the first rotating direction D1 within the grooves 11D. During this process, one of the pawls 12B pivotally moves the pivoting part 20 of the contact member 19 in the first rotating direction D1.

While the cover 12 is being rotated in the first rotating direction D1, a portion of the pressing part 12A maintains contact with the pressure-receiving part 111 on the printing cassette 100. Hence, the printing cassette 100 is continuously pressed in the downward direction while the cover 12 is moving from the covering position to the engaged position and after the cover 12 has reached the engaged position.

The pivotal movement of the pivoting part 20 rotates the converting part 21 to cause the converting part 21 to begin pressing the holder 18 toward the nip position. When the cover 12 arrives in the engaged position, the contact member 19 is moved into the pressing position, and the holder 18 is moved into the nip position, as illustrated in FIG. 7. Further, upon arrival of the cover 12 at the engaged position, one of the four pawls 12B becomes engaged with the engaging part 11E (specifically, the protrusion 11I of the engaging part 11E becomes fitted in the recess of the pawl 12B).

Since the contact member 19 is maintained in the pressing position by the engagement of the pawl 12B with the housing 11 (specifically, with the engaging part 11E), the holder 18 is also maintained in the nip position. As a result, the print head 13 and platen roller 15 nip the printing tape of the printing cassette 100, and the platen gear 16 and output gear 106 are maintained in an engaged state. Thus, the printing device 1 enters a print-ready state.

Next, the procedure for detaching the printing cassette 100 from the device body 10 will be described. First, the cover 12 is rotated from the engaged position in the second rotating direction D2, causing the four pawls 12B to retract from their positions shown in FIG. 2A.

This operation releases the pressure applied to the holder 18 by the pawl 12B via the contact member 19. As a result, the holder 18 is moved by an urging force to the non-nip position. In accordance with the movement of the holder 18 to the non-nip position, the contact member 19 moves into the non-pressing position.

After the pawls 12B have been retracted to a position in which the pawls 12B can be extracted from the corresponding grooves 11D, the cover 12 is detached from the housing 11 by being lifted in the upward direction. Thereafter, the printing cassette 100 is detached from the device body 10 by being pulled in the upward direction out of the cassette attaching opening 11A.

1-2. Effects of the Embodiment

The embodiment described above in detail can obtain the following effects.

(1a) Since the platen roller 15 moves in a state where the cassette attaching opening 11A is covered with the cover 12, movement of the printing cassette 100 while the platen roller 15 is in contact with the printing tape due to the user touching the printing cassette 100 or the like can be suppressed. Thus, this configuration can suppress the printing tape from having problems as a result of the printing tape being nipped by the platen roller 15.

(1b) Since pivotal movement (movement in the first rotating direction D1) of the pawl 12B of the cover 12 causes the contact member 19 to move the holder 18 from the non-nip position to the nip position, the operation for locking the cover 12 can be achieved simultaneously with the operation for moving the holder 18.

(1c) The cover 12 is easily aligned with the housing 11 since the cover 12 has a plurality of pawls 12B evenly spaced along the rotating direction. This reduces the time and effort required to attach the cover 12.

(1d) Since the cover 12 includes the pressing part 12A for pressing the printing cassette 100 in the attaching direction, the platen roller 15 can be made to nip the printing tape paid out from the printing cassette 100 while the printing cassette 100 is maintained in a prescribed attached position. This arrangement prevents the printing cassette 100 from moving after the printing tape is nipped.

(1e) The cylindrical shape of the pressing part 12A enables contact of the pressing part 12A with the pressure-receiving part 111 of the printing cassette 100 during attachment of the cover 12 to the housing 11, regardless the rotated posture of the cover 12.

(1f) Since the housing 11 has a columnar shape or truncated cone shape and the printing cassette 100 has a rectangular parallelepiped shape, the printing cassette 100 can be suppressed from being inserted into the cassette attaching opening 11A in the wrong orientation.

(1g) Since the power switch 25 is provided on the bottom surface 11G of the housing 11, the design of the printing device 1 can be enhanced and also the power switch 25 can be suppressed from being inadvertently operated when the housing 11 tips over.

2. Other Embodiments

While the detailed description has been made to the specific embodiment, it would be apparent to those skilled in the art that many modifications and variations may be made therein.

(2a) In the printing device of the embodiment described above, the cover need not necessarily cover the entire cassette attaching opening but may cover just part of the cassette attaching opening. Additionally, the cover need not necessarily be provided with the pressing part.

(2b) In the printing device of the embodiment described above, the contact member need not necessarily be configured of the pivoting part and the converting part. For example, the contact member may be configured of a single independent part or a combination of three or more parts.

(2c) In the printing device of the embodiment described above, the holder need not necessarily move in conjunction with the pawl of the cover. For example, the holder may move to the nip position in conjunction with movement of a part in the cover other than the pawls.

(2d) In the printing device of the embodiment described above, the number of pawls possessed by the cover is not limited to four. That is, the cover may have three or less pawls or five or more pawls. Additionally, the plurality of pawls need not necessarily be arranged at equal intervals along the rotating direction of the cover.

(2f) In the printing device of the embodiment described above, the housing is not limited to a columnar shape or a truncated cone shape. That is, the housing may be shaped like a prism or a truncated pyramid.

(2g) In the printing device of the embodiment described above, the holder may retain the print head instead of the platen roller. In other words, the printing device may be configured to nip the printing tape by moving the print head relative to a platen roller that is fixed to the housing.

(2h) Functions possessed by a single component in the embodiment described above may be distributed among a plurality of components, and functions possessed by a plurality of components may be integrated into a single component. Additionally, some of the structures in the embodiment described above may be omitted. Further, at least some of the structures in one embodiment described above may be added to other embodiments described above or used in other embodiments instead of those therein. All aspects included in the technical concepts identified from descriptions in the claims are embodiments of the present disclosure.

What is claimed is:

1. A printing device comprising:

a housing having a columnar shape with a space in which a printing tape is attachable from above, the space being defined at an upper portion of the housing;

a print head provided inside the housing; and a cover attachable to the housing in an up-down direction, the cover being movable between a covering position in which the cover covers the upper portion of the housing and an engaged position in which the cover is engaged with the housing, the cover being configured to move between the covering position and the engaged position by rotating about an axis of the housing, wherein the printing device is configured to switch, in conjunction with movement of the cover from the covering position to the engaged position, from a non-printable state in which the printing device cannot print on the printing tape to a printable state in which the printing device can print on the printing tape.

2. The printing device according to claim 1, further comprising:

a platen roller provided inside the housing, the platen roller facing the print head; and a holder holding one of the print head and the platen roller, the holder being movable between a nip position in which the printing tape is nipped between the print head and the platen roller and a non-nip position in which the printing tape is not nipped between the print head and the platen roller, wherein the holder is configured to move from the non-nip position to the nip position in conjunction with movement of the cover from the covering position to the engaged position.

3. The printing device according to claim 2, wherein the cover includes a pawl configured to be engaged with the housing when the cover is in the engaged position, the printing device further comprising a contact member configured to contact the pawl, the contact member being movable between a pressing position in which the contact member presses the holder toward the nip position and a non-pressing position in which the contact member does not press the holder, the contact member being further configured to:

move from the non-pressing position to the pressing position in conjunction with movement of the cover from the covering position to the engaged position; and move from the pressing position to the non-pressing position in conjunction with movement of the cover from the engaged position to the covering position.

4. The printing device according to claim 3, wherein the contact member includes:

a pivoting part configured to pivotally move together with the pawl about the axis; and a converting part coupled to the pivoting part so as to be rotatable relative to the pivoting part, the converting part being further coupled to the holder so as to be rotatable relative to the holder, the converting part being configured to convert pivotal movement of the pawl into movement of the holder from the non-nip position to the nip position.

5. The printing device according to claim 2, wherein the holder is urged from the nip position toward the non-nip position, the holder being further configured to move from the nip position to the non-nip position in conjunction with movement of the cover from the engaged position to the covering position.

6. The printing device according to claim 1, wherein the cover includes a plurality of pawls arranged at equal intervals along a rotating direction of the cover, at least one of the plurality of pawls being configured to be engaged with the housing when the cover is in the engaged position.

* * * * *